Sept. 23, 1958 J. H. REID 2,853,550

SYNCHRONIZING CIRCUIT

Filed March 10, 1953 3 Sheets-Sheet 1

INVENTOR.
JAMES H. REID
BY Darby & Darby
ATTORNEYS

INVENTOR.
JAMES H. REID
BY Darby & Darby
ATTORNEYS

INVENTOR.
JAMES H. REID

BY Darby & Darby

ATTORNEYS 2,853,550

SYNCHRONIZING CIRCUIT

James H. Reid, Maywood, N. J., assignor to Allen B. Du Mont Laboratories, Inc., Clifton, N. J., a corporation of Delaware Application March 10, 1953, Serial No. 341,553

5 Claims. (Cl. 178—7.5)

Figures 1, 2:
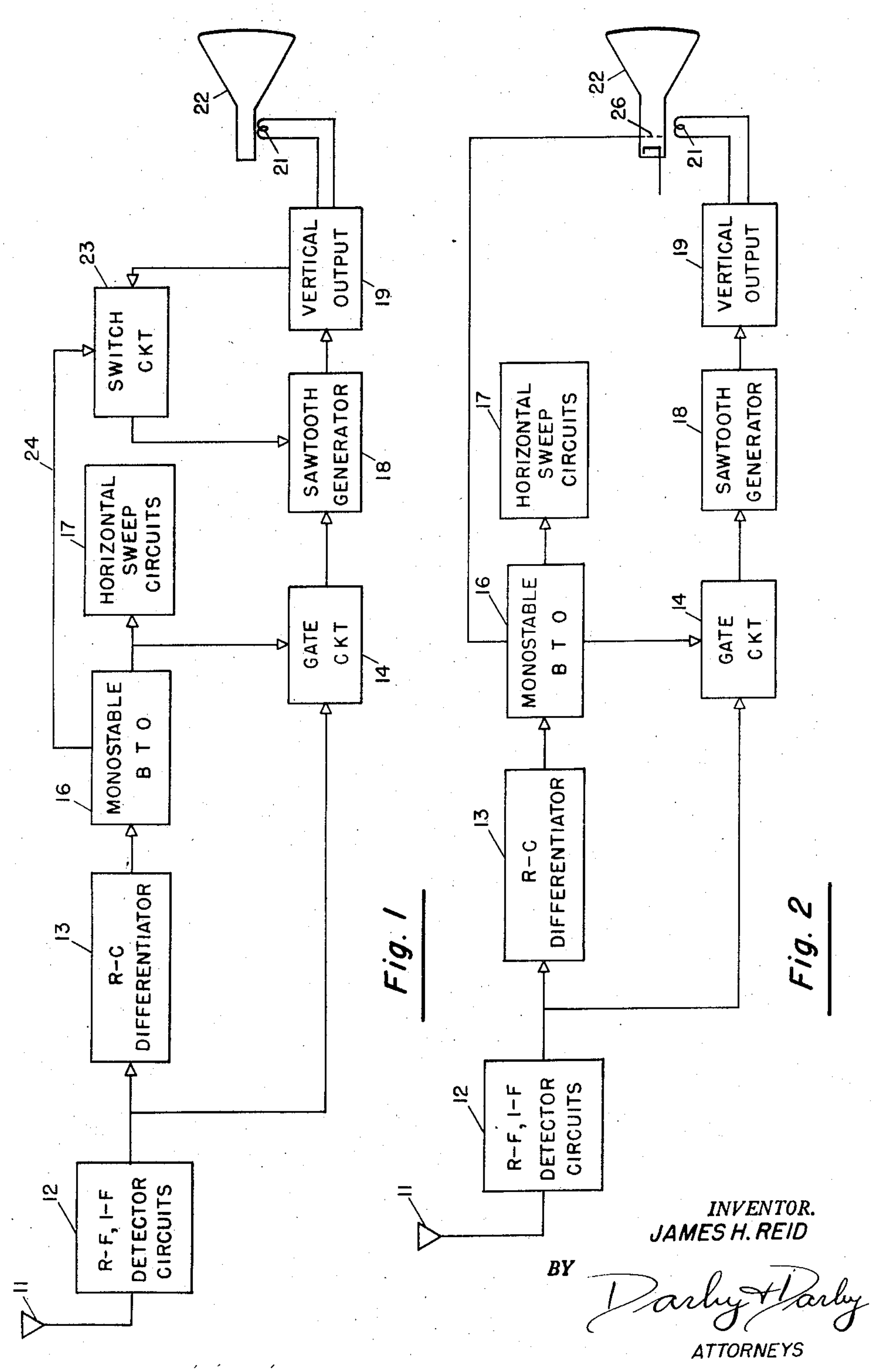

This invention relates to circuits for electrical synchronization by means of synchronizing pulses, and particularly to the separation of vertical and horizontal synchronizing pulses in television receivers.

Objects of the invention are to provide a synchronizing circuit having improved synchronization and interlace. Other objects will be apparent.

Figure 3:
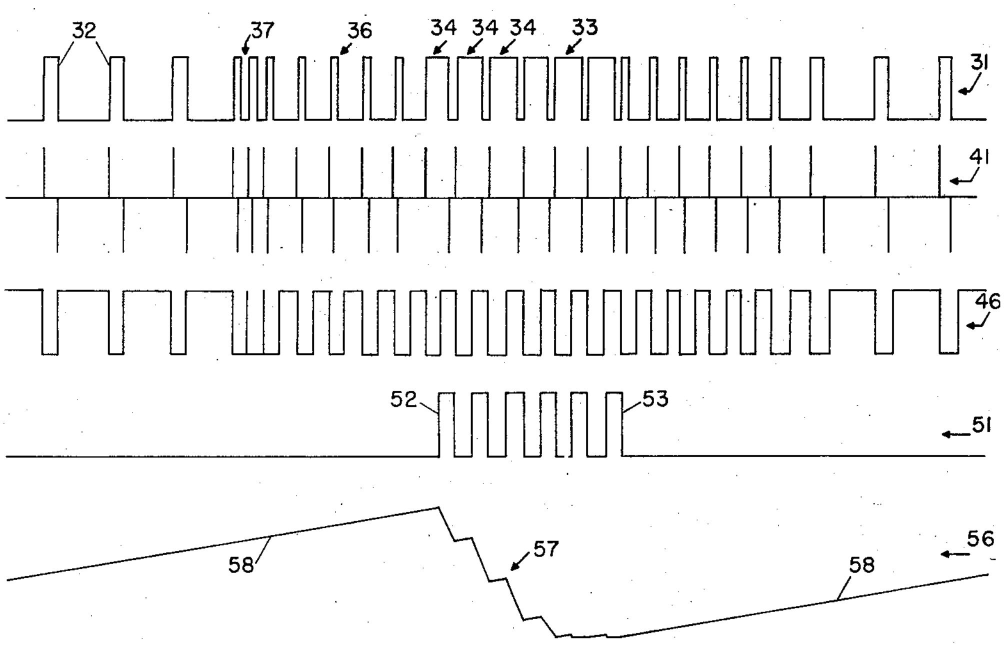
Figure 4:
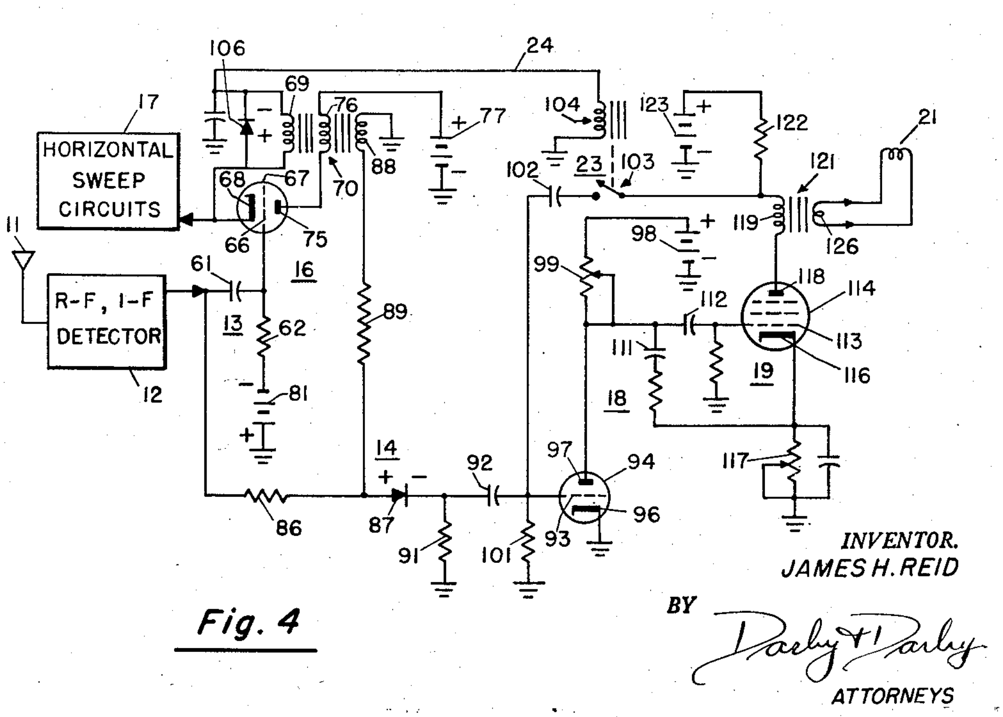
Figure 5:
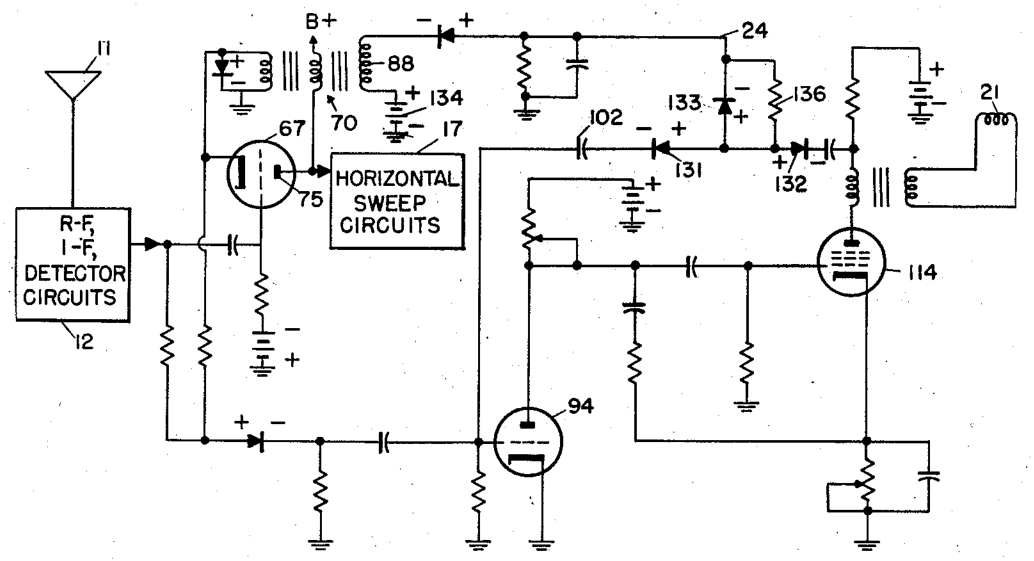
Figure 6:
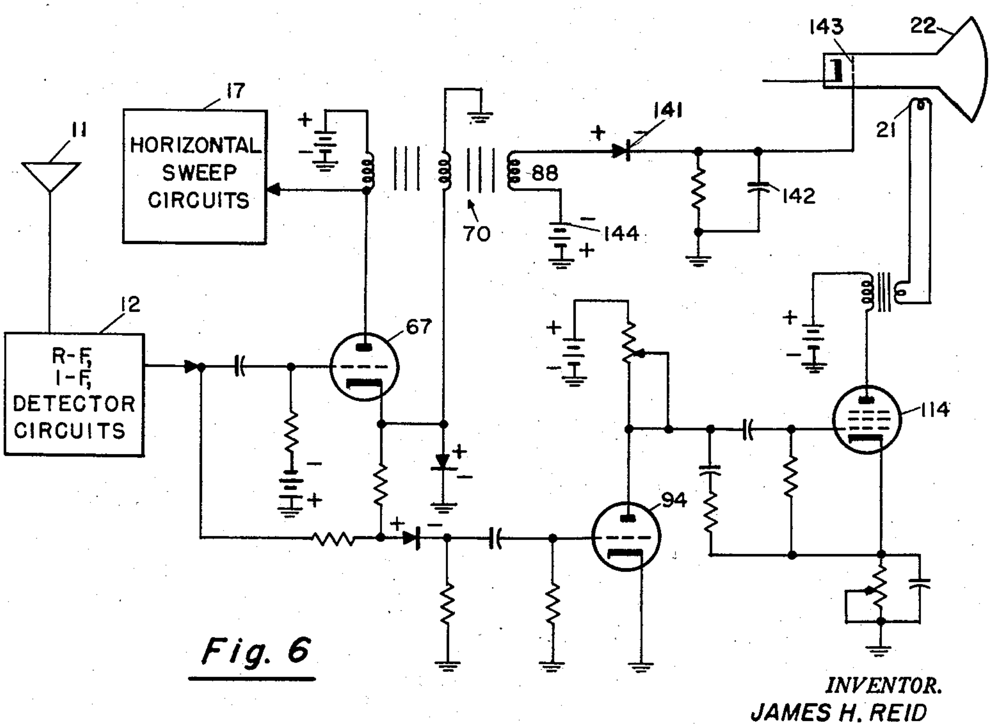

Referring to the drawings,

Figures 1 and 2 are block diagram representations of preferred embodiments of the invention, and differ only as to operation when there is no synchronizing signal, Figure 3 is a graphical representation of electrical signals which occur in different parts of the circuits shown in Figures 1 and 2, Figures 4 and 5 show alternative electrical schematic diagrams which may be used in performing the functions of the block diagram shown in Figure 1, and Figure 6 shows an electrical schematic diagram of a circuit which may be used in the block diagram representation of Figure 2.

Referring to the block diagrams of Figures 1 and 2, a television receiving antenna 11 is connected to television circuits 12 which provide a conventional video output signal which in turn is connected to the input of a differentiator circuit 13 and to a gated circuit 14. The output from the differentiator circuit 13 is fed to a monstable blocking tube oscillator circuit 16 which provides an output signal which is connected to actuate horizontal sweep circuits 17 and which also is connected to the gated circuit 14 to serve as a gating control therefore. Portions of the video signal from the circuits 12 are allowed to pass through the gated circuit 14 and are fed to a sweep circuit or sawtooth generator 18, the output signal of which is fed to a vertical output amplifier 19, the output signal of which is connected to a vertical deflection coil 21 positioned adjacent a television picture tube 22.

In Figure 1, there is shown a positive fedback from the vertical output amplifier 19, through a switch circuit 23, to the sawtooth generator 18. The switch circuit 23 is controlled by a connection 24 from the blocking tube oscillator 16. The embodiment of Figure 2 is not provided with a feedback circuit, but instead is provided with an electrical connection between the blocking tube oscillator 16 and a control electrode 26 of the picture tube 22.

The invention, as represented in Figures 1 and 2, operates as follows, referring to the electrical signals represented in Figure 3. The sync portion of video signal 31, which is obtained from the receiver circuits 12, comprises the conventional horizontal synchronizing pulses 32 which are relatively narrow, the conventional serrated vertical synchronizing pulse 33, the serrated parts 34 thereof being relatively wider than the horizontal pulses 32, equalizing pulses 36, and may include color synchronizing pulses 37 which are relatively narrower than the horizontal pulses 32. The differentiator 13 provides at its output differentiated pulses 41 corresponding to the various pulses of the video signal 31. The differentiated pulses 41 function to trigger the blocking tube oscillator 16, which, in turn, produces a series of negative-going gating pulses 46, each of the gating pulses 46 being initiated in accordance with the leading edges of the video pulses 31, and each of the gating pulses 46 having a width equal to or slightly greater than the width of the horizontal synchronizing pulses 32.

The gating pulses 46 function to gate the gated circuit 14 into its "off" position, so that for the duration of any gating pulses 46 there can be no transmission of a signal of the group of signals 31 through the gating circuit 14 to the sawtooth generator 18. Accordingly, the output signal from the gating circuit 14, which is applied to the sawtooth generator 18, will appear as a saw-forming signal or group of pulses 51 occurring only when there are vertical synchronizing pulses 33 in the video signal 31 since such vertical pulses have a longer duration than pulses 46 and therefore signals each of a duration equal to the difference pass through gate 14. In the signal 51, there are no horizontal or equalizing synchronizing pulses since the horizontal pulses 32 and equalizing pulses 36 and the color pulses 37, cannot pass through the gating circuit 14 due to this circuit being in "off" condition throughout the duration of the relatively short horizontal pulses 32, equalizing pulses 36 or color pulses 37 in the video signal 31.

Accordingly, as indicated in Figure 3, the vertical saw-forming pulse 51, fed to the sawtooth generator 18, is a "clean" pulse having an accurately timed and fast-rising leading edge 52, and an accurately timed and fast-falling trailing edge 53, thereby resulting in more stable and more accurate synchronization than is obtainable in conventional synchronizing circuits.

The sawtooth generator 18 provides a sawtooth wave 56 having a retrace portion 57, the retrace portion 57 being caused by the discharge of a condenser by the vertical pulses 51, and the saw part 58 of the sawtooth signal being caused by the charging of the sweep condenser, as will be described hereafter. It will be noted that the zig-zag configuration of the retrace portion 57 of the sawtooth signal 56 is in conformity with individual pulses of the vertical saw-forming signal 51.

Referring to Figure 4, there is a schematic representation of a circuit in accordance with the block diagram of Figure 1, the differentiator 13 comprising a series capacitor 61 and a shunt resistor 62, in the well-known manner, the differentiated video signal being fed to a control electrode 66 of a blocking oscillator tube 67 having a cathode 68 connected to a first winding 69 of a blocking oscillator transformer 70, and having an output electrode 75 connected to a second winding 76 of the transformer 70, the remaining end of winding 76 being connected to a source 77 of voltage. The cathode 68 is connected to provide horizontal synchronizing signals to the horizontal sweep circuits 17 which, in turn, provide a horizontal sawtooth signal to a horizontal deflection coil (not shown) positioned near the picture tube 22, in conventional manner. A source 81 of voltage provides bias for the control electrode 66.

The video signal 31 from the receiver circuits 12 is also connected through a resistor 86 to a gating crystal 87 and to a third winding 88 on the transformer 70 through a resistor 89, the remaining end of the winding 88 being electrically grounded. The output terminal of the gating crystal 87 is connected to a load resistance 91 and through a coupling condenser 92 to a control electrode 93 of a sawtooth generator tube 94 having a cathode 96 which is grounded and an anode output electrode 97 connected to a source 98 of voltage through a variable resistance 99.

The control electrode 93 is returned to ground through a resistance 101 and also is connected through a condenser 102 to a switch (normally open) 103 associated with a relay coil 104, this relay coil being connected between electrical ground the remaining end of the first winding 69 of the oscillator transformer 70. A "catching diode" 106 is connected across the first winding 69, to permit quick re-triggering of the blocking tube 67 of the oscillator 16. The condenser 92, resistor 101, and control electrode 93 of tube 94, function to clamp the vertical sawtooth triggering signal 51 to ground potential, this signal 51 being formed from the video signal 31 by the gating action of the blocking tube oscillator 16 and the gating crystal 87 due to gating pulses 46 from the third winding 88 biasing the gating crystal 87 to be conductive during portions 34 of the vertical synchronizing pulses 33.

The output electrode 97 of the sawtooth generator tube 94 is connected, through a saw-forming condenser 111, to electrical ground and thence to the voltage source 98. The saw-forming condenser 111 is charged by the voltage source 98 through the resistance 99, thereby forming the saw portion 58 of the sawtooth signal 56. During this time the tube 94 is non-conducting. When the sawtooth forming signal 51 occurs, the tube 94 is rendered electrically conductive, discharging the condenser 111 to form the retrace portion 57 of the sawtooth wave 56, this sawtooth wave 56 being coupled through a condenser 112 to a control electrode 113 of a vertical output amplifier tube 114 having a cathode 116 connected to electrical ground through a resistance 117. As shown, an end of saw-forming condenser 111 is connected to the top end of the cathode resistor 117, thereby providing feedback for improved linearity.

An output electrode 118 of the amplifier tube 114 is connected through a primary winding 119 of an output transformer 121 and through a resistor 122 to a source 123 of voltage. A secondary winding 126 of transformer 121 is connected to the deflection yoke or coil 21. The junction of the primary winding 119 and resistor 122 is connected to a terminal of the feedback switch 103.

The feedback switch 103 operates as follows:

When the blocking tube oscillator 16 is functioning due to video signals 31 being present at the output of the receiver circuits 12, the relay switch 103 is in "open" position. Whenever video signals 31 are not being provided from the receiver circuits 12, such as when tuning the circuits 12 between television channels, the sawtooth generator 18 would cease functioning and, thus, would destroy the vertical sweep at the picture tube 22. This undesirable effect is prevented by the relay-operated feedback circuit between the output transformer 121 and the control electrode 93 of the sawtooth generator tube 94, the relay 104 functioning to close this feedback circuit whenever the blocking tube oscillator 16 is not functioning, thereby forming a feedback loop around the oscillator tube 94 whereby the sawtooth generator is rendered self-oscillating to provide vertical sweep whenever the video signal 31 is not being provided by the receiver circuits 12.

The embodiment of Figure 5 is essentially similar to that of Figure 4 except that the relay elements 103, 104 in the positive feedback loop are replaced by a rectifier feedback loop system comprising rectifiers 131, 132 connected in back-to-back series relationship in the feedback loop to form a gated circuit in conjunction with a rectifier 133 connected between the junction of feedback rectifiers 131, 132 and an end of the third winding 88 of the oscillator transformer 70, the remaining end of this winding being connected to a source 134 of voltage, instead of to the resistor 89 of Figure 4. The rectifier 133 is shunted by a resistor 136. The winding 88 provides gating bias voltage pulses to the rectifiers 131, 132. The schematic circuit of Figure 5 performs the same functions as that of Figure 4, and actuates a positive feedback loop around the sawtooth generator whenever there is an absence of video signals 31. As shown in Figure 5, the horizontal sweep circuits 17 may be connected to the output electrode 75 of the oscillator tube 67.

In the absence of any signal in line 24 (as when tuning between channels), diodes 131, 132 and 133 assume a moderately high resistance (in the order of thousands of ohms) since there is no net voltage across resistor 136. Constants of the sweep circuit, including tubes 114 and 94, are therefore chosen to sustain feedback under this condition of a moderately high series resistance in the feedback loop.

When signals are present on line 24 (due to the presence of incoming synchronizing signals) the normal current flow through winding 88 and voltage source 134 to ground will polarize diodes 131, 132 and 133 in the manner indicated by the plus and minus signs in Fig. 5. Thus, the diodes are caused to assume a high resistance (of the order of hundreds of thousands of ohms) thereby increasing the series resistance in the feedback loop. This increase in resistance in the feedback loop prevents the feedback of a signal of sufficient magnitude to sustain oscillation.

In the embodiment of Figure 6, the structure and operation is essentially similar to that of Figures 4 and 5 except that the feedback loop around the sawtooth generator 18, and the switch circuit 23, are eliminated, and the output signal from the third winding 88 of the oscillator transformer 70 is connected through a rectifier 141 to a filter condenser 142, thereby forming a D.-C. bias voltage which is connected to a control electrode 143 of the picture tube 22 in such a polarity as to cause proper operating intensity of the electron beam in the tube 22, in conjunction with a source 144 of fixed bias, when the blocking tube oscillator 16 is functioning. The bias voltage developing on winding 88 when sync pulses are being received has a greater magnitude and is opposite in polarity to voltage source 144. The current flowing in winding 88 as a result of synchronizing signals applied to triode 67 is in such a direction that diode 141 offers a high resistance. In the absence of signals in windings 188, source 144 prevents a current flow in the opposite direction and diode 141 then conducts more. It is this reversing of current through the resistor associated with capacitor 142 that biases control grid 143 to substantially cut off the electron beam in picture tube 122, thereby rendering the viewing face of the tube 22 relatively dark during tuning of the receiver 12 between TV channels or in the absence of a TV signal. In conventional systems, the TV screen is annoyingly bright or displays bright flashes when tuning between TV channels.

It will be appreciated that the invention provides an improved synchronizing circuit relatively immune to noise signals and which generates stable and uniformly shaped horizontal and vertical synchronizing pulses, thereby assuring reliable operation of the horizontal and vertical sweep or deflection circuits, and causing a steady, accurately interlaced picture on the TV screen. The invention also provides automatic operation of the sweep circuit in the absence of video signals, and renders the TV picture screen relatively dark when tuning the TV receiver.

While preferred embodiments and modifications of the invention have been shown and described, various other embodiments and modifications will occur to those skilled in the art, and will fall within the scope of invention as defined in the following claims.

What is claimed is:

1. A synchronizing system for television or the like comprising a source of synchronizing pulses, some of said pulses having relatively short durations and others of said pulses having relatively long durations, a sweep circuit for generating sweep voltages when said pulses having relatively long durations are applied thereto, a gated circuit connected in series between said source of pulses and said sweep circuit, and actuating means connected to said gated circuit actuating said gated circuit to prevent said pulses having relatively short durations from reaching said sweep circuit and to permit pulses of relatively long duration to pass to said sweep circuit.

2. The system in accordance with claim 1, in which said actuating means comprises a pulse generator connected to be actuated by the leading edges of said synchronizing pulses, said pulse generator providing gating pulses of substantially the same durations of that of said synchronizing pulses having relatively short durations, said gated circuit being rendered in off condition by said gating pulses, whereby portions of said pulses having relatively long durations reach said sweep circuit.

3. The system in accordance with claim 2, in which said sweep circuit comprises a saw-forming condenser, means for electrically charging said condenser at a predetermined time-rate, and a discharge means connected to discharge said condenser when actuated by said portions of said pulses having relatively long durations.

4. The system in accordance with claim 1, in which said sweep circuit normally is non-operative in the absence of said pulses of relatively long durations, and including means for automatically rendering said sweep circuit self-operating in the absence of said last-named pulses.

5. The system in accordance with claim 4, in which said means for automatically rendering the sweep circuit self-operating comprises a feedback loop around said sweep circuit, and means to electrically break said feedback loop when said relatively long synchronizing signals occur.

References Cited in the file of this patent

UNITED STATES PATENTS

| | | |
|---|---|---|
| 2,231,792 | Bingley | Feb. 11, 1941 |
| 2,594,380 | Barton et al. | Apr. 29, 1952 |
| 2,601,415 | Oliver | June 24, 1952 |
| 2,607,847 | Heissig | Aug. 19, 1952 |
| 2,654,800 | Tourshou et al. | Oct. 6, 1953 |